United States Patent [19]

Brewbaker et al.

[11] 4,245,068

[45] Jan. 13, 1981

[54] LOW PROFILE ADDITIVES FOR UNSATURATED POLYESTER RESINS

[75] Inventors: James L. Brewbaker; Rodrique L. Marzett, both of Midland; William A. Sprenger, Coleman, all of Mich.

[73] Assignee: The Dow Chemical Company, Midland, Mich.

[21] Appl. No.: 864,978

[22] Filed: Dec. 27, 1977

[51] Int. Cl.$^3$ ............................................. C08L 67/06
[52] U.S. Cl. ................................... 525/447; 525/440; 525/445; 525/921
[58] Field of Search ................. 260/861; 528/306; 525/447, 440, 445, 921

[56] References Cited

U.S. PATENT DOCUMENTS

| | | | |
|---|---|---|---|
| 3,464,852 | 9/1969 | Caldwell et al. | 260/861 X |
| 3,483,169 | 12/1969 | Case et al. | 260/861 X |
| 3,516,955 | 6/1970 | Taft | 260/22 |
| 3,701,748 | 10/1972 | Kroekel | 260/40 |
| 3,729,528 | 4/1973 | Werner et al. | 260/862 |
| 3,810,863 | 5/1974 | Hatton, Jr. et al. | 260/40 R |
| 3,836,300 | 9/1974 | Brewbaker et al. | 260/836 |
| 3,887,515 | 6/1975 | Pennington et al. | 260/40 R |
| 3,989,655 | 11/1976 | Rudolph et al. | 260/16 |

FOREIGN PATENT DOCUMENTS 2139330 2/1973 Fed. Rep. of Germany .

*Primary Examiner*—Theodore E. Pertilla

[57] ABSTRACT

The shrinkage of a thermosettable composition comprising an unsaturated polyester and a vinyl monomer capable of cross-linking the polyester is reduced during cure by the addition to the composition of an alkylene oxide polymer which is soluble in the thermosettable composition but which is substantially less soluble in the cured thermoset composition.

19 Claims, No Drawings

LOW PROFILE ADDITIVES FOR UNSATURATED POLYESTER RESINS

BACKGROUND OF THE INVENTION

This invention relates to methods for reducing shrinkage of a thermosettable polyester composition during cure, and to thermosettable and thermoset compositions employed therein.

Thermosettable polyester compositions possess many desirable properties such as a rapid cure rate, ease in handling, the facility to accept color and the ability to be easily modified for special characteristics. The resulting cured polyester compositions exhibit many useful properties such as dimensional stability, thermal stability and chemical properties such as resistance to attack by water and other solvents. When admixed with reinforcing materials such as glass fibers, these cured compositions have excellent mechanical properties such as high tensile and flexural strengths and moduli. Because of these properties, polyesters are used extensively in coatings, molding applications and reinforced plastic products.

Generally, thermosettable polyester compositions comprise an unsaturated polyester dissolved in a vinyl monomer such as styrene. Upon curing, the thermosettable polyester composition is cross-linked in the presence of a free radical initiator to form a thermoset composition by the reaction of the vinyl monomer with the unsaturated groups in the polyester. During this curing reaction the conventional polyester composition shows significant shrinkage. As a consequence, when the thermosettable polyester composition is subjected to compression or injection molding using a mold, there is a tendency for the shaped articles to become warped or cracked. Moreover, the shrinkage causes sink marks and irregularities on the surface of many shaped articles.

In view of these deficiencies, it has become common practice to incorporate in the unsaturated polyester and vinyl monomer mixture a small amount of a low profile additive such as a thermoplastic material, e.g., polystyrene and polyacrylate, to reduce shrinkage. See, for example, the paper given in 1970 at the 25th Annual Conference of the Society of the Plastics Industry (SPI) by Nussbaum et al., Section 6E, pages 1-5, "Smooth Surface Pre-mix and Sheet Molding Compound Technology". Upon curing of the thermosettable composition, the thermoplastic additive absorbs the volume lost by the resin. The exact mechanism by which the additive absorbs chemical shrinkage is not well understood. However, it is known that to be effective the additive must be insoluble in the thermosetting composition during cure such that two phases are present, one phase consisting primarily of the additive and styrene and the other phase consisting primarily of polyester and styrene.

In most cases, the use of a thermoplastic material as a low profile additive requires a two-package system. One of the packages generally contains the polyester-styrene resin solution and the other package generally contains a solution of the low profile additive; i.e., thermoplastic material in styrene. The two packages are insoluble and must be mixed prior to use. Cure must follow shortly thereafter, as the mixture upon standing will separate into two distinct macroscopic phases, one phase being additive rich and the other phase being rich in unsaturated polyester. When this separation occurs, remixing is required before further processing. For this reason, the two-package systems are often economically undesirable.

Several methods have been suggested for solving the problem of dispersion stability found in a two-package system. In one method, as discussed in U.S. Pat. No. 3,852,376, a polyethylene powder is employed as the low profile additive. This solves the dispersion stability problem. Unfortunately, due to the relatively poor compatibility between the unsaturated polyester resin and the polyethylene, the polyethylene exudes to the surface of the resin during cure. Consequently, the shaped articles lack in surface luster and uniformity. In a second method, as described in U.S. Pat. No. 3,852,376, a thermoplastic resin having an acid radical; e.g., a copolymer of methyl methacrylate and acrylic acid, is used as the low profile additive. The use of a thermoplastic resin of this type has been shown to improve dispersion stability. However, dispersion stability problems still exist after extended storage and the shaped articles prepared using the additive show pronounced nonuniformity of coloration. In yet another method, as presented in U.S. Pat. No. 3,836,600, adding a stabilizer, such as a poly(styrene-b-ethylene oxide) emulsifier to the thermosettable polyester composition containing a thermoplastic, low profile additive has been proposed. The resulting two-phase emulsion is stabilized by the emulsifier. Unfortunately, this stabilized emulsion requires an additional ingredient, i.e., the emulsifier, thereby increasing the costs of the molded article. Moreover, although stability of the emulsion is increased, stability problems still exist after extended storage.

In view of the stated deficiencies of the prior art methods, it remains highly desirable to provide an improved method of reducing the shrinkage of unsaturated polyester resins during cure.

SUMMARY OF THE INVENTION

Accordingly, one aspect of the present invention is an improved process for preparing a thermoset polyester composition wherein a thermosettable composition of an unsaturated polyester and a vinyl monomer capable of cross-linking the unsaturated polyester is subjected to conditions sufficient to form a thermoset composition. The improvement comprises adding to the thermosettable composition an amount of a suitable alkylene oxide polymer sufficient to reduce the shrinkage of the thermosettable composition during cure. By the term "suitable alkylene oxide polymer" is meant an alkylene oxide polymer which is soluble in the thermosettable composition and is substantially less soluble in the cured thermoset composition.

Other aspects of the present invention are a thermosettable composition comprising an unsaturated polyester, a vinyl monomer capable of cross-linking the unsaturated polyester, and an amount of a suitable alkylene oxide polymer sufficient to reduce the shrinkage of the thermosettable composition during cure and to the thermoset compositions derived therefrom.

The mixing of a suitable alkylene oxide polymer with a thermosettable composition of an unsaturated polyester and vinyl monomer produces a solution having infinite stability. Upon cure, the alkylene oxide polymer becomes substantially less soluble in the polyester. Surprisingly, these solubility characteristics facilitate the formation of shaped or molded articles having excellent surface uniformity. Moreover, the alkylene oxide polymers do not deleteriously effect the polyester's desirable physical or chemical properties.

The thermoset polyester compositions are useful in coating and molding applications and in producing reinforced plastic articles.

DETAILED DESCRIPTION OF PREFERRED EMBODIMENTS

The thermosettable compositions most advantageously employed in this invention are unsaturated polyester resinous compositions comprising an unsaturated polyester, a vinyl monomer capable of cross-linking the polyester and an alkylene oxide polymer. These compositions when subjected to sufficient conditions such as heat and pressure in the presence of a polymerization initiator, form a thermoset composition.

The methods of preparing the unsaturated polyesters and the specific monomers employed in their formation are not critical to the practice of this invention. The raw materials, their proportions, polymerization temperatures, catalysts and other conditions are well known in the art and usable in the practice of this invention. Reference is made thereto for the purposes of this invention. For purposes of illustration and not limitation, reference is particularly made to Polymer Processes, edited by Calvin E. Schildknecht, published in 1958 by Interscience Publishers, Incorporated, New York, Chapter XVII; "Polymer Reinforcement" by H. L. Gerhart and E. W. Moffet, pages 766–782 and to Organic Chemistry of Synthetic High Polymers by Robert W. Lenz, published in 1968 by Interscience Publishers, Incorporated, New York, Chapter IV; "Carbonyl Addition—Elimination Reactions", pages 82–87 and 89–101.

Typically, the unsaturated polyesters are derived from $\alpha,\beta$-unsaturated polycarboxylic components and polyhydric alcohols. Suitable $\alpha,\beta$-unsaturated polycarboxylic components include the $\alpha,\beta$-unsaturated polycarboxylic acids, and the esters or anhydrides of such acids, or mixtures thereof. Suitable $\alpha,\beta$-unsaturated polycarboxylic acids include maleic, fumaric, aconitic, itaconic, mesaconic, citraconic, monochloromaleic and the like. The dicarboxylic components are preferred with fumaric acid and maleic anhydride being the most preferred for low shrinkage applications. Saturated polycarboxylic components, i.e., saturated polycarboxylic acid and the esters and anhydrides of such acids, are often used as partial replacement for the unsaturated carboxylic components to vary the degree of unsaturation in the polyester resin. Suitable saturated carboxylic acids include phthalic, isophthalic, adipic, azelaic, terephthalic, oxalic, malonic, succinic, glutaric, sebacic, and the like. In low shrinkage applications, the unsaturated carboxylic components are usually present in a concentration of at least about 50 weight percent, preferably from about 65 to about 100 weight percent of the total polycarboxylic component employed.

Typical polyhydric alcohols used to prepare the unsaturated polyester are those alcohols having two hydroxy groups, although minor amounts of alcohol having more or less groups may be used. Dihydroxy alcohols usually employed include diethylene glycol; dipropylene glycol; ethylene glycol; 1,2-propylene glycol; 1,4-butanediol; 1,4-pentanediol; 1,5-hexanediol and the like with 1,2-propylene glycol being preferred for use in low shrinkage applications. Mixtures of the foregoing alcohols are also suitably employed. Preferably, in low shrinkage applications, at least about 70 percent by weight of such mixture is 1,2-propylene glycol. The polyhydric alcohol component of the polyester is usually stoichiometric or in slight excess with respect to the acid. The excess of the polyhydric alcohol will seldom exceed about 20 to 25 mole percent and usually is between about 2 and about 10 mole percent.

The unsaturated polyester is generally prepared by heating a mixture of the polyhydric alcohol and the polycarboxylic component in their proper molar ratios at elevated temperatures, usually between about 100° and 250° C. for extended periods of time, generally ranging from 5 to 15 hours. Polymerization inhibitors such as t-butylcatechol may advantageously be used.

Generally, the esterification of the polycarboxylic component is carried out until an acid number in the range of from about 10 to about 100, usually below 55, and a number average molecular weight (Mn) between about 750 to about 5000 is achieved.

The vinyl monomers capable of cross-linking the unsaturated polyesters typically employed in the unsaturated polyester composition include styrene; side chain substituted styrenes such as $\alpha$-methyl styrene, $\alpha$-ethyl styrene and the like; ring substituted styrene such as ar-alkyl styrene and ar-halostyrene; acrylates; methacrylates and the like.

Typically, the resinous composition contains from about 20 to about 75 weight percent of vinyl monomer and from about 80 to about 25 weight percent of the unsaturated polyester. Usually, the vinyl monomer is styrene, but for radiation cure an acrylate may be preferred.

Suitable alkylene oxide polymers employed as the low profile additive in the practice of this invention are those having solubility characteristics such that they are "soluble" in the thermosettable composition and "substantially less soluble" in the cured thermoset composition. The term "soluble" denotes that the alkylene oxide polymer forms a true solution when admixed with the thermosettable composition in an amount sufficient to cause a measurable reduction in shrinkage during cure of the thermosettable composition. By "measurable reduction in shrinkage" is meant that shrinkage is reduced by an amount measurable on conventionally used test methods, e.g., test method outlined in Note 2 of Table II in Example 3 of the present invention. Preferably, such amount of alkylene oxide polymer will reduce shrinkage by at least 20 volume percent, more preferably at least 40 volume percent, when compared to the same thermosettable composition without the alkylene oxide polymer. By way of example, a thermosettable composition exhibiting a shrinkage of 10 volume percent during cure based on the total volume of the thermosettable composition exhibits at least 20 percent less shrinkage upon the addition of the alkylene oxide polymer if the shrinkage during cure is then equal to or less than 8 volume percent based on the total volume of the thermosettable composition. Preferably, the alkylene oxide polymer is soluble to at least about 3 weight percent, more preferably to at least about 7 weight percent based on the total weight of the unsaturated polyester, vinyl monomer, and alkylene oxide polymer. By "substantially less soluble" is meant that an amount of the alkyene oxide polymer that is dissolved in the thermosettable composition is insoluble in the cured thermoset composition, thereby providing a measurable reduction in the shrinkage of the thermosettable composition during cure. Preferably, this amount of the alkylene oxide polymer which is insoluble in the cured thermoset composition is at least about 2 weight percent, more preferably at least about 4 weight percent, based on the total weight of the unsaturated polyester, vinyl monomer and alkylene oxide polymer.

For the purposes of this invention, solubility in the thermosettable composition is easily determined by the following procedure. To the desired unsaturated polyester and vinyl monomer solution is added the alkylene oxide polymer at the desired percentage to make a twenty gram sample of the thermosettable composition. The thermosettable composition is thoroughly stirred on a Hamilton Beach Model 30 mixer at its highest speed for about one minute. Five grams of the blended material is added to a 15 ml glass centrifuge tube and centrifuged on an International Clinical Model CL centrifuge operated at about 2500 rpm for 60 minutes at room temperature, about 23° C. At the end of this period, the centrifuge tubes are visually inspected for clarity and the presence of two phases. If they are clear and no interface is noted, the alkylene oxide polymers are presumed to form a true solution.

For the purposes of this invention, the solubility of the alkylene oxide polymer in the cured thermoset composition is easily determined by taking the remaining 15 grams of the thermosettable sample from the foregoing test procedure, thoroughly mixing therein a curing initiator at its desired concentration and placing the resultant mixture into a 6 cm diameter pan of aluminum foil. This is allowed to cure at room temperature, about 23° C., until hard, generally between about 0.2 and about 4 hours. The cured thermoset composition is then inspected. If the composition is clear, the alkylene oxide polymer is presumed soluble. If cloudy, as evidenced by opacity and whiteness in the cured sample, the polymer is presumed to have separated from solution to form a second phase, thereby indicating significant insolubility. The percent of alkylene oxide which is insoluble is found by varying the concentrations of the polymer in the formulation to determine the lowest concentration of alkylene oxide polymer at which the phase separation is observed. At concentrations above this concentration, any additional amount of polymer is presumed to be insoluble.

Preferred alkylene oxide polymers are poly(alkylene oxides) of the formula:

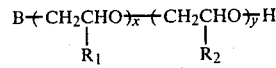

wherein B is hydroxy or the residue of an organic active hydrogen initiator, $R_1$ and $R_2$ are independently hydrogen, methyl or ethyl provided that when either $R_1$ or $R_2$ is hydrogen, the other is methyl or ethyl, and x and y are integers such that the poly(alkylene oxide) is soluble in the thermosettable composition and substantially less soluble in the cured thermoset composition.

Organic active hydrogen initiators suitably employed in the preparation of the poly(alkylene oxide) are those compounds which have a functional group capable of reacting with the hydrogen of a hydroxy group. Examples of suitable compounds include monohydric alkyl alcohols, polyhydric alkyl alcohols, hydroxy terminated polyalkylene polyethers and the like.

The composition and molecular weight of the alkylene oxide polymer and the thermosettable composition in which the polymer is added effect the solubility characteristics of the polymer. Typically, desirable solubility characteristics are obtainable when the average value of x and y are such that (1) the carbon to oxygen atomic ratio is from about 2.1 to about 4 and (2) the Mn of the poly(alkylene oxide) is in the range from about 6000 to about 400. For example, at Mn of 6000 the carbon to oxygen atomic ratio is advantageously between about 2.1 to about 2.5. At a Mn of about 1800, the carbon to oxygen atomic ratio is advantageously between about 2.3 and about 3. Thus, when both $R_1$ and $R_2$ are methyl, the values of x plus y are such that the Mn of the polymer is typically from about 600 to about 1800, whereas when both $R_1$ and $R_2$ are ethyl, x plus y are such that the Mn is between about 400 and about 1200 to obtain desirable solubility.

Preferably, both $R_1$ and $R_2$ are methyl and the resulting poly(propylene oxide) has a Mn of from about 800 to about 1600. Also preferred are poly(alkylene oxides) wherein $R_1$ is hydrogen and $R_2$ is methyl, wherein x has an average value from about 5 to 45 and y has an average value between 10 and 30, the Mn being between about 1500 and 3000. Most preferably, $R_1$ and $R_2$ are methyl with a Mn from about 1000 to about 1500.

Methods of preparing the poly(alkylene oxides) are well known in the art and reference is made thereto for purposes of this invention.

Other alkylene oxide polymers which are suitable, but less preferred, include alkylene oxide copolymers of the formula:

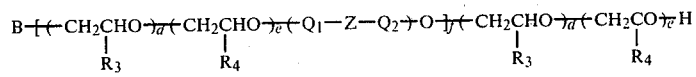

wherein B is hydrogen or the residue of an organic active hydrogen initiator as hereinbefore described; $R_3$ and $R_4$ are independently hydrogen, ethyl or methyl provided $R_3$ and $R_4$ are not all hydrogen or ethyl; each Z is independently hydrocarbylene; each $Q_1$ is independently

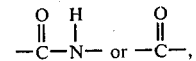

$Q_2$ is independently

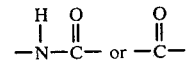

and d, e and f are independently integers such that the alkylene oxide copolymer is soluble in the thermosettable composition and substantially less soluble in the thermoset composition.

The difunctional hydrocarbylene radical as represented by $-(Q_1-Z-Q_2)-$ is derived from a difunctional molecule having isocyanate (NCO) or anhydride functional groups. Examples of difunctional molecules suitably employed for this purpose include toluene diisocyanate, 4,4'-diphenylmethane diisocyanate, trimellitic anhydride acid chloride, pyromellitic dianhydride, and 3,3',4,4'-benzophenonetetracarboxylic dianhydride.

Preferred is toluene diisocyanate. Preferably, f is 1, 2 or 3, with f being 1 or 2 most preferred.

Typically, for an alkylene oxide copolymer wherein the Mn is between about 500 and about 6000, f is 1 or 2 and each $R_3$ and $R_4$ is independently hydrogen or methyl, desired solubility characteristics are obtained when the ratio of hydrogen to methyl is from about 0.1 to about 10. In a similar alkylene oxide copolymer wherein each $R_3$ and $R_4$ are independently hydrogen and ethyl, the desired solubility characteristics are typically obtained when the ratio of hydrogen to ethyl is from about 0.3 to about 15. The ratio of hydrogen to methyl and hydrogen to ethyl is the ratio of the total number of hydrogen atoms as represented by $R_3$ and $R_4$ to the total number of methyl or ethyl molecules represented by $R_3$ and $R_4$. For alkylene oxide copolymers wherein all of $R_3$ and $R_4$ are methyl, the most desired solubility characteristics are exhibited by those having an Mn from about 600 and 2400. Other values of d, e, f, $R_3$ and $R_4$ giving desirable solubility characteristics are easily determined by the solubility tests hereinbefore described.

The alkylene oxide copolymer is advantageously prepared by reacting a poly(alkylene oxide) of desirable molecular weight and composition with a suitable difunctional hydrocarbylene compound. When $R_3$ and $R_4$ are equal the difunctional compound and poly(alkylene oxide) are admixed at concentrations proportional to their final composition in the polymer. The admixture, under constant agitation, is heated to a temperature of from about 50° to about 150° C. until completion of the reaction. When either $R_3$ or $R_4$ is hydrogen, a poly(alkylene oxide) having a secondary hydroxy functionality, i.e., poly(propylene oxide) or poly(butylene oxide) is advantageously reacted with the difunctional compound prior to the addition of the poly(ethylene oxide).

Following their preparation, the alkylene oxide polymers are advantageously admixed with a vinyl monomer prior to their addition in the thermosettable composition. Preferably, the vinyl monomer is the same as the vinyl monomer used in the preparation of the thermosettable composition, although other vinyl monomers compatible with the thermosettable compositions can be employed. Generally, a solution of from about 30 to about 80 weight percent vinyl monomer, and from about 20 to about 70 weight percent of the alkylene oxide polymers is advantageously employed. Less preferably, the alkylene oxide polymer is added in its pure form, i.e., without being premixed with a vinyl monomer, to the thermosettable polyester composition.

The resulting thermosettable composition containing the alkylene oxide polymer is then advantageously agitated under conditions sufficient to dissolve the alkylene oxide polymer. Concentrations of the alkylene oxide polymer advantageously employed are those which provide minimum volume change during cure as determined by the change in density between the thermosettable composition and thermoset composition. This concentration will vary depending on the solubility characteristics of the particular alkylene oxide polymer and thermosettable composition employed. Typically, preferred concentrations are from about 3 to about 25 weight percent, especially from about 7 to about 15 weight percent of the alkylene oxide polymer based on the total weight of the unsaturated polyester, vinyl monomer and alkylene oxide polymer.

Often, the thermosettable compositions are blended with a reinforcing material such as glass or sisal and/or other adjuncts such as pigments, plasticizers, flame retardants, extenders and the like prior to cure to impart the desirable physical and chemical properties. The type and amount of adjuncts used are not critical to the application of this invention. Adjuncts conventionally employed and their effects on the cured thermoset composition are well known in the art. Merely for purposes of illustration and not for limitation, reference is made to *Polyester Resins* by John R. Lawrence, published in 1960 by Reinhold Publishing Corporation, New York, Chapter 7, "Compounding Resins for Use", pages 106–122.

Following admixture of the alkylene oxide polymer and other adjuncts to the thermosettable composition, the mixture is advantageously cured at conditions such as temperature and pressure to a thermoset composition. Any conventional curing techniques may be employed in the practice of this invention. The initiators, temperatures, proportions and other curing conditions are well known in the art and are usable in the practice of this invention. Merely for purposes of illustration and not for limitation, reference is made to *Polyester Resin* by John H. Lawrence, published in 1960 by Reinhold Publishing Corporation, New York, Chapter 6; "Catalysts and Curing", pages 88–105.

Typically, in low shrinkage applications, the thermosettable compositions will contain a free radical generator such as a peroxygen; e.g., benzoyl peroxide, or azo compound; e.g., azobisisobutyronitrile, to act as a crosslinking initiator and an inhibitor such as hydroquinone. Optionally, other materials may advantageously be admixed with the thermosettable composition such as a retarder or accelerator to facilitate cure. The resulting admixture is usually cured at temperatures from about 105° to about 165° C. at pressures from about 50 to about 2000 psi until a suitable degree of cross-linking is attained. At this point the cure is substantially stopped by releasing the pressure and/or lowering the temperature.

To show the advantages of the alkylene oxide polymers as low shrinkage additives for thermosettable polyester compositions, the following examples are presented. These examples are set forth to illustrate the invention and should not be construed to limit its scope. In the examples, all parts and percentages are by weight unless otherwise indicated.

EXAMPLE 1

To determine the solubility characteristics of various poly(propylene oxides), several formulations are prepared by adding solutions of different poly(propylene oxides), as specified in Table I, dissolved in styrene to an unsaturated polyester resin composition at concentrations also specified in Table I. The unsaturated polyester resin composition is sold by Rohm and Haas as P-340 and comprises 35 percent styrene and 65 percent unsaturated polyester. The unsaturated polyester is a poly(fumaric acid-co-propylene glycol) with an acid number of 22.5 and viscosity of about 1070 cps measured on a Brookfield viscometer, spindle No. 2, at 2 rpm and 20° C.

The formulations are added to 2 ounce bottles (20 grams of a formulation per bottle) and thoroughly mixed on a Hamilton Beach Model 30 blender for about 1 minute at the highest speed setting. A 5 g portion of each formulation is immediately added to a 15 ml glass centrifuge tube and centrifuged on an International Clinical Model CL centrifuge operated at about 2500 rpm for 60 minutes at room temperature. At the end of this period, the samples are visually inspected for clarity and the presence of a liquid-liquid interface which would indicate the presence of two liquid phases and insolubility.

The remaining portion of each formulation is thoroughly mixed with 0.015 grams of a 12 percent cobalt naphthenate solution sold as 12 percent Cobalt Ten Cem by the Mooney Chemical Company and 0.0075 grams of dimethyl aniline using the Hamilton Beach blender at the highest speed setting for 1 minute. Following this mixing, 0.15 g of a 60 percent solution of methyl ethyl ketone peroxides and hydroperoxides in dimethyl phthalate sold by the Ludicol Division of the Penwalt Corporation, as Lupersol DDM, is added under agitation for 1 minute. Immediately following this mixing, the resulting formulation is poured into a shallow aluminum pan of 6 cm in diameter and allowed to cure at room temperature, about 23° C., for 1 hour. The cured discs are then inspected for clarity. If the discs are clear, the alkylene oxide polymer is presumed soluble in the cured resin. If the discs are opaque and white, the alkylene oxide polymer is presumed to be insoluble. The approximate percent of poly(propylene oxide) determined to be insoluble is presumed to be the difference between the percent where initial insolubility was found to occur with any additional amount of polymer presumed to be insoluble.

The results of this testing are shown in Table I.

TABLE I

SOLUBILITY CHARACTERISTICS OF POLY(PROPYLENE OXIDE)[1]

| Thermo-settable Composition | A | B | C | D | E |
|---|---|---|---|---|---|
| R/S/P[2] | 67/30/3 | 65.5/29.5/5 | 64/29/7 | 62/28/10 | 60/27/13 |
| M$_n$[3] | | | | | |
| 400 | 0* | 0* | 0* | 0* | 0* |
| 1200 | 0* | trace* | 2 | 5 | 8 |
| 2000 | 3 | I* | I* | I* | I* |

*Not an example of the present invention.
[1]The letter I in the table represents the undesirable solubility characteristic wherein the poly(propylene oxide) is insoluble to some extent in the thermosettable composition. The numbers in the table represent the percent of poly(propylene oxide) which is insoluble in the thermoset composition based on the total weight of the polyester, styrene and alkylene oxide polymer. Trace indicates initial insolubility in the thermoset composition. A 0 indicates the undesirable characteristic wherein the poly(propylene oxides) are completely soluble in both the thermosettable and thermoset composition.
[2]R represents the unsaturated polyester and vinyl monomer mixture sold by Rohm and Haas as P-340, S represents the styrene in which the poly(propylene oxide) is dissolved prior to its addition to the P-340, and P represents poly(propylene oxide).
[3]Mn is the number average molecular weight of the poly(propylene oxide) used in the formulation as determined by end group analysis.

As evidenced by Table I, a poly(propylene oxide) having a Mn of 1200 exhibits the preferred solubility characteristics when added to the thermosettable composition at concentrations from about 7 to about 13 percent. When cured, the thermosettable compositions having the preferred solubility characteristics exhibit a reduction in shrinkage of at least 20 volume percent when compared to the same thermosettable composition not having an alkylene oxide polymer incorporated therein. Other suitable alkylene oxide polymers are easily found by the same procedure.

EXAMPLE 2

Solubility characteristics of three alkylene oxide copolymers of the formulae:
E(2000)—T—P(2000)—T—E(2000)
E(1000)—T—P(1010)—T—E(1000)
E(600)—T—P(1010)—T—E(600)
wherein E represents poly(ethylene oxide), P represents poly(propylene oxide), —T— represents:

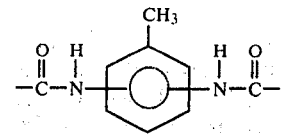

wherein about 80 percent of the

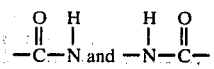

groups is in the 2,4-position and 20 percent is in the 2,6-position and the figure in parenthesis is the Mn of the P and E group as determined by end group analysis. A 13 g portion of each alkylene oxide copolymer is dissolved in separate 100 ml beakers containing 27 g of styrene. The resulting solutions are added to separate 200 ml beakers containing 60 g of the unsaturated polyester resin composition of Example 1, e.g., P-340. Solubility testing of the three resulting thermosettable compositions is conducted in a manner identical to Example 1. All three alkylene oxide copolymers are found to be soluble in the thermosettable composition and substantially less soluble in the cured thermoset composition. When cured, the three thermosettable compositions exhibit a reduction in shrinkage of at least 20 volume percent when compared to the identical thermosettable composition not having an alkylene oxide polymer incorporated therein.

EXAMPLE 3

A thermosettable composition is prepared by mixing on a Cowles mixer for about 1 minute the following ingredients in the stated proportions:

| Ingredient | Parts |
|---|---|
| Polyester[1] | 60 |
| Poly(propylene oxide)/Styrene[2] | 40 |
| t-Butyl Peroctoate | 1 |
| Zelec UN[3] | 0.5 |

[1]The unsaturated polyester resin composition of Example 1.
[2]A 33 percent solution of poly(propylene oxide) having a Mn of 1200 dissolved in styrene.
[3]A fatty alcohol ester of orthophosphoric acid sold by DuPont and used as a mold release agent.

The resulting mixture is a clear, one-phase solution. This solution is denoted Sample E.

Three hundred and fifty grams of the solution are evenly spread on two 12 inch by 18 inch layers of 2 ounce per square foot continuous strand glass mats sold by Owens/Corning Fiberglas ® as M-8605 glass mats. Over the solution is placed two 12 inch by 18 inch layers of 0.15 ounce per square foot continuous strand veil mats sold by Modiglass Fibers as 0.010 SSM veil mat. The resulting composition is molded into a rectangular tray measuring 16.25 inch by 10.25 inch by 0.1 inch using a Dake 25 ton hydraulic press by subjecting the composition to a temperature of about 149° C. for 90 seconds at 300 psi pressure.

Other thermosettable compositions (Samples B-D and F) are prepared in the same manner using different percentages of styrene, unsaturated polyester and poly(propylene oxide) as denoted in Table II. A thermosettable composition (Sample A) is also prepared using no poly(propylene oxide). A rectangular tray is made from these compositions in the identical manner as outlined above.

The density changes between the cured thermoset compositions and thermosettable compositions are measured for both Sample A and the samples (Samples B–F) containing the poly(propylene oxide). From these data the percent of volume changes during cure are calculated. The surface uniformity of the rectangular trays are also measured. The results of this testing are reported in Table II.

TABLE II

VOLUME CHANGES AND SURFACE PROFILES OF POLYESTER RESIN FORMULATIONS CONTAINING 1200 MOLECULAR WEIGHT POLY(PROPYLENE OXIDE)

| Thermosettable Composition[1] | A* | B | C | D | E | F |
|---|---|---|---|---|---|---|
| R/S/P | 69/31/0 | 64/29/7 | 62/28/10 | 61.6/27.6/11.5 | 60/27/13 | 58/26/16 |
| % Volume Change[2] | −11.3 | −7.2 | −4.1 | −0.5 | +3.3 | +2.6 |
| Surface profile[3] μin. | 1200 | 683 | 430 | 150 | 154 | 220 |

*Not an example of this invention.
[1]Same as [2] in Table I.
[2]Volume change (shrinkage) is measured by the change in density between the thermosettable composition and the cured thermoset composition at 25° C. The density of the thermosettable composition is determined by weighing a known volume of the composition at 25° C. using the following method. After formulation, the thermosettable composition is placed in a 25 ml volumetric flask to a level just below the line. The composition is allowed to stand until no bubbles are observed. The composition is then placed in a constant temperature bath at 25° C. for one hour and is then dried and weighed. Water which has been conditioned at 25° C. is added to the flask to bring the liquid level up to the line and the flask is weighed. The density of the thermosettable composition ($d_u$) is determined using the equation:

$$d_u = \frac{W_{fr} - W_f}{25 - (\frac{W_{frw} - W_{fr}}{0.9971})}$$

wherein $W_f$ is the weight of the flask, $W_{fr}$ is the weight of the flask plus the resin and $W_{frw}$ is the weight of the flask, resin and water. The density of water at 25° C. is 0.9971 grams per milliliter.
Density of the thermoset composition is found by cutting a 15 × 19 cm hole in the center of the glass mats and veil mats before cure. Following cure, samples of the thermoset composition having no glass fibers therein are cut from this area. Each sample is inspected for voids, cracks, and crevices which might trap air and cause errors in the determined densities. In most cases where the resin system does not shrink appreciably (<8%) samples are obtainable which are visually free of defects and from which reliable densities can be obtained. However, when systems are molded containing little or no effective low profile additive, the resin shrinks and cracks badly. In these cases the densities are determined on the largest defect free sample which can be found. In several instances cracking is so bad that no large pieces are present and densities are determined on samples which contained several cracks. Several samples shrink badly and have to be molded with one layer of veil mat in the sample zone to obtain samples with few cracks. The densities of these resin formulations are calculated from the sample densities by subtracting the known weight and volume of the glass present in the sample. A small hole is drilled in each cured sample and it is suspended on a fine copper wire. The samples are weighed in air and again immersed in water at 25° C. A few samples are less dense than water and a small lead shot is attached to them to keep them submerged. The densities ($d_c$) of the thermoset samples are calculated using the equation:

$$d_c = \frac{0.9971 W_a}{W_a - (W_w - W_{sw} - W_{Lw})}$$

$W_a$ is the weight of the coupon in air. $W_w$ is the weight of the coupon plus suspending wire plus lead shot (if used) in water. $W_{sw}$ is the weight of the suspending wire submerged in water to the same level as it was when holding the coupon and $W_{Lw}$ is the weight of the lead shot suspended in water (entered if used). The volume change (Δv) is then calculated by dividing the uncured density ($d_u$) by the cured density ($d_c$) and subtracting 1 from the quotient.
[3]The smoothness of the veil mat side of the molded TV trays is measured using a Micrometrical Type RAE profilometer. These measurements are taken over a 2.5 inch scan and recorded in microinches (μin). The complete scan is subdivided into five 0.5 inch segments. The surface profile values reported are the average of the maximum surface deviations recorded for each segment, with the lower values representing the smoother surfaces.

As evidenced by the foregoing data, the poly(propylene oxide) having a number average molecular weight of 1200 is effective as low profile additive when added to the thermosettable composition at concentrations which exhibit preferred solubility characteristics. A concentration of 11.5 percent of poly(propylene oxide) based on the weight of resin, styrene and low profile additive is most preferably used.

What is claimed is:

1. An improved process for preparing a thermoset polyester composition wherein a thermosettable composition of an unsaturated polyester and vinyl monomer capable of cross-linking the polyester is subjected to conditions sufficient to form a thermoset composition, the improvement comprising adding to the thermosettable composition an alkylene oxide polymer soluble in the thermosettable composition and substantially less soluble in the cured thermoset composition, said alkylene oxide polymer being present in an amount such that the alkylene oxide polymer and the thermosettable composition form a true solution and a portion of the alkylene oxide polymer in solution with the thermosettable composition is insoluble in the cured thermoset composition, said amount being sufficient to reduce the shrinkage in the thermosettable composition during cure.

2. The improved process of claim 1 wherein the alkylene oxide polymer is soluble in the thermosettable composition at concentrations of at least 3 weight percent based on the total weight of the unsaturated polyester, vinyl monomer and alkylene oxide polymer and substantially less soluble in the cured thermoset composition such that at least about 2 weight percent of the alkylene oxide polymer based on the total weight of the unsaturated polyester, vinyl monomer and alkylene oxide polymer is insoluble.

3. The improved process of claim 2 wherein the alkylene oxide polymer comprises from about 3 to about 25 weight percent of the thermosettable composition based on the weight of the unsaturated polyester, vinyl monomer and alkylene oxide polymer, at least about 2 weight percent of the alkylene oxide polymer in solution with the thermosettable composition based on the total weight of the unsaturated polyester, vinyl monomer and alkylene oxide polymer is insoluble in the cured thermoset composition, and the shrinkage during cure is reduced by at least 40 percent.

4. The improved process of claim 3 wherein the alkylene oxide polymer is a poly(alkylene oxide) represented by the formula:

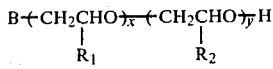

wherein B is hydroxy or the residue of an organic active hydrogen initiator, $R_1$ and $R_2$ are hydrogen, methyl or ethyl provided when $R_1$ or $R_2$ is hydrogen, the other is methyl or ethyl and x and y are integers such that the poly(alkylene oxide) is soluble in the thermosettable composition and substantially less soluble in the cured thermoset composition.

5. The improved process of claim 4 wherein $R_1$ and $R_2$ are methyl and the poly(alkylene oxide) has a number average molecular weight (Mn) between about 800 and about 1600.

6. The improved process of claim 4 wherein the alkylene oxide polymer has a carbon to oxygen ratio between about 2.1 and about 4 and a Mn from about 6000 to about 400.

7. The improved process of claim 4 wherein $R_1$ is hydrogen; $R_2$ is methyl; x has an average value from about 5 to about 45, and y has an average value from about 10 to about 30 and a Mn between about 1500 and about 3000.

8. The improved process of claim 3 wherein the alkylene oxide polymer is represented by the formula:

9. The improved process of claim 8 wherein the $(Q_1-Z-Q_2)$ is derived from the group consisting of toluene diisocyanate; 4,4'-diphenylmethane diisocyanate; trimellitic anhydride acid chloride; pyromellitic dianhydride; and 3,3',4,4'-benzophenone tetracarboxylic dianhydride.

10. The improved process of claim 8 wherein f is 1 or 2, $R_3$ and $R_4$ are independently hydrogen and methyl, with a ratio of hydrogen to methyl being from about 0.1 to about 10 and the alkylene oxide polymer has a number average molecular weight of from about 500 to about 6000.

11. The improved process of claim 8 wherein f is 1 or 2, $R_3$ and $R_4$ are independently hydrogen and ethyl, with a ratio of hydrogen to ethyl being from about 0.3 to about 15 and the alkylene oxide polymer has a number average molecular weight of from about 500 to about 6000.

12. The improved process of claim 8 wherein f is 1 or 2, $R_3$ and $R_4$ are methyl and the alkylene oxide polymer has a number average molecular weight of from about 600 to 2400.

13. A thermosettable composition comprising an unsaturated polyester, a vinyl monomer capable of crosslinking the unsaturated polyester, and a soluble alkylene oxide polymer which is substantially less soluble in a thermoset composition derived from the thermosettable composition, said alkylene oxide polymer being present in an amount such that the alkylene oxide polymer, vinyl monomer and unsaturated polyester form a true solution and a portion of the alkylene oxide polymer in solution is insoluble in the cured thermoset composition, said amount being sufficient to reduce the shrinkage of the thermosettable composition during cure.

14. The thermosettable composition of claim 13 comprising from about 3 to about 25 weight percent of the alkylene oxide polymer wherein at least about 2 weight percent of the soluble alkylene oxide polymer based on the total weight of the unsaturated polyester, vinyl monomer and alkylene oxide polymer is insoluble in the cured thermoset composition and the shrinkage is re-

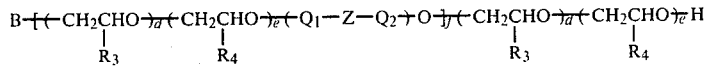

wherein B is hydrogen or the residue of an organic active hydrogen initiator as hereinbefore described; $R_3$ and $R_4$ are hydrogen, ethyl or methyl provided $R_3$ and $R_4$ are not all hydrogen or ethyl; each Z is independently hydrocarbylene; each $Q_1$ is independently

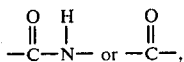

each $Q_2$ is independently

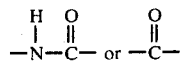

and d, e and f are independently integers such that the alkylene oxide copolymer is soluble in the thermosettable composition and substantially less soluble in the thermoset composition.

duced by at least 40 percent during cure.

15. The thermosettable composition of claim 13 wherein the soluble alkylene oxide polymer is of the formula:

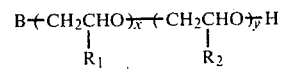

wherein B is hydroxy or the residue of an organic active hydrogen initiator, $R_1$ and $R_2$ are hydrogen, methyl or ethyl provided when $R_1$ or $R_2$ is hydrogen, the other is methyl or ethyl and x and y are integers such that the alkylene oxide polymer is soluble in the thermosettable composition and substantially less soluble in the thermoset composition.

16. The thermosettable composition of claim 13 wherein the soluble alkylene oxide polymer is represented by the formula:

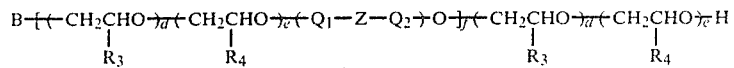

wherein B is hydrogen or the residue of an organic active hydrogen initiator as hereinbefore described; $R_3$ and $R_4$ are hydrogen, ethyl or methyl; each Z is independently hydrocarbylene; each $Q_1$ is independently

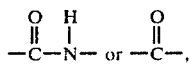

each $Q_2$ is independently

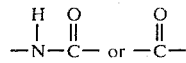

and d, e and f are independently integers.

17. A thermoset composition derived from the thermosettable composition of claim 13.

18. A thermoset composition derived from the thermosettable composition of claim 15.

19. A thermoset composition derived from the thermosettable composition of claim 16.

* * * * *